(12) United States Patent
Rasool et al.

(10) Patent No.: US 8,773,990 B1
(45) Date of Patent: Jul. 8, 2014

(54) DETECTING UNAUTHORIZED TETHERING

(75) Inventors: Shahzada Rasool, Sterling, VA (US);
Aik Chindapol, Washington, DC (US);
Daniel Vivanco, Reston, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 306 days.

(21) Appl. No.: 13/365,492

(22) Filed: Feb. 3, 2012

(51) Int. Cl.
*H04L 1/00* (2006.01)
*H04J 1/16* (2006.01)

(52) U.S. Cl.
USPC .......................................... 370/230; 370/235

(58) Field of Classification Search
None
See application file for complete search history.

(56) References Cited

U.S. PATENT DOCUMENTS

| 7,239,865 | B2 | 7/2007 | Dyck et al. |
| 8,074,279 | B1* | 12/2011 | Lin et al. .......................... 726/23 |
| 2010/0034124 | A1* | 2/2010 | Payyappilly et al. .......... 370/310 |
| 2011/0086610 | A1* | 4/2011 | Baldwin et al. ............... 455/405 |
| 2012/0144451 | A1* | 6/2012 | Gutt et al. .......................... 726/3 |
| 2012/0264375 | A1* | 10/2012 | Shankaranarayanan ..... 455/41.2 |
| 2013/0159503 | A1* | 6/2013 | Erman et al. ................... 709/224 |
| 2013/0171964 | A1* | 7/2013 | Bhatia et al. ................... 455/411 |

* cited by examiner

*Primary Examiner* — Eunsook Choi

(57) ABSTRACT

In systems and methods of detecting a wireless device utilizing unauthorized tethering, a plurality of wireless devices in communication with an access node is detected, and a suspect device list of wireless devices which are not authorized for tethering is determined from among the plurality of detected wireless devices. An expected hop value is stored for each suspect device, a data packet is received from each suspect device, and a first hop value is determined for each suspect device. Based on a first comparison of the expected hop value and the first hop value at least one suspect device is identified as performing unauthorized tethering.

15 Claims, 5 Drawing Sheets

US 8,773,990 B1

DETECTING UNAUTHORIZED TETHERING

Wireless devices can provide access to wireless communication networks and to a wide range of services available through such communication networks. Wireless devices can also share their capability to access wireless networks with other devices, sometimes referred to as tethering. The use of wireless devices for authorized tethering is a major concern for network operators. While typical network resource consumption by a wireless device by itself is relatively small, unauthorized tethering can cause an increase in the usage of network resources, and can also contribute to network congestion having a negative impact to other network subscribers. Furthermore, unauthorized tethering creates unfairness among subscribers, since network operators typically allocate resources to subscribers who are authorized to perform tethering, but plan no such allocation for subscribers who are not authorized. Where, for example, communication bandwidth is allocated proportionally to the amount of data transferred, those wireless devices which are performing unauthorized tethering transmit and receive more data because they are supporting multiple devices, and unauthorized devices tend to demand greater services than those devices not performing tethering.

Overview

Systems and methods of detecting a wireless device utilizing unauthorized tethering are provided. A plurality of wireless devices in communication with an access node is detected, and a suspect device list of wireless devices which are not authorized for tethering is determined from among the plurality of detected wireless devices. An expected hop value is stored for each suspect device, a data packet is received from each suspect device, and a first hop value is determined for each suspect device. Based on a first comparison of the expected hop value and the first hop value at least one suspect device is identified as performing unauthorized tethering.

DETAILED DESCRIPTION

In systems and methods of detecting a wireless device utilizing unauthorized tethering, a plurality of wireless devices in communication with an access node is detected, and a suspect device list of wireless devices which are not authorized for tethering is determined from among the plurality of detected wireless devices. An expected hop value is stored for each suspect device, a data packet is received from each suspect device, and a first hop value is determined for each suspect device. Based on a first comparison of the expected hop value and the first hop value at least one suspect device is identified as performing unauthorized tethering. In addition, a second data packet can be received from each suspect device, and based on the second data packet a second hop value can be determined for each suspect device. Based on a second comparison of the first hop value to the second hop value at least one suspect device can be identified as performing unauthorized tethering.

Tethering refers to the sharing by a wireless device of its capability to access wireless networks with another device. An example of tethering is when a mobile phone which is enabled to access the Internet through a wireless communication network shares its network access capability with another device, for example, a laptop computer. A wireless device can be capable of sharing its network access with multiple additional devices. In any case, the wireless device and the additional device or devices share the network connection of the wireless device. The connection between the wireless device and the additional device can be made through a wired or wireless connection.

Unauthorized tethering is of great concern to network operators. It increases the consumption of network resources, such as bandwidth, and can also cause network congestion. With the advent of wireless devices capable of acting as a network access point, for example, as a WiFi hot spot, increasing numbers of users are modifying wireless devices to enable such network access point feature without authorization from a network provider.

Figure 1:
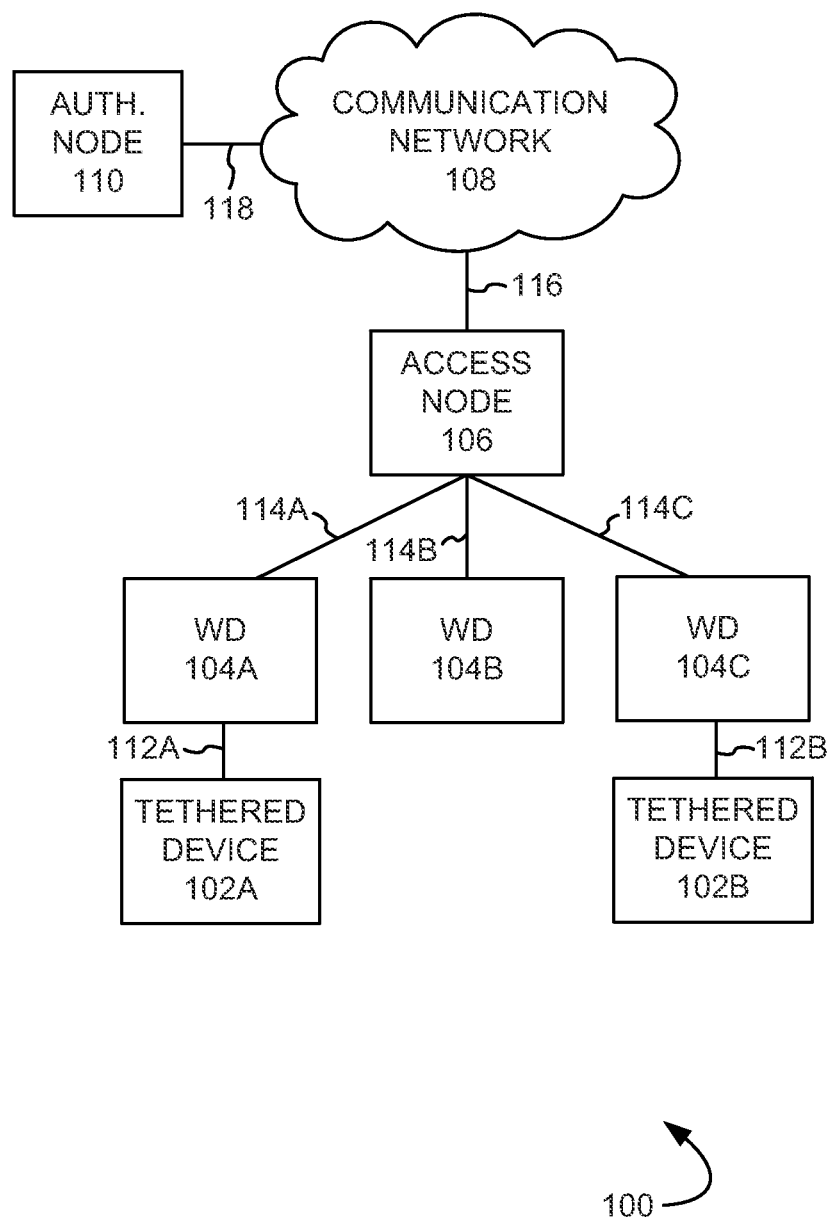
FIG. 1 illustrates an exemplary communication system to detect wireless devices utilizing unauthorized tethering.

FIG. 1 illustrates an exemplary communication system 100 for detecting wireless devices utilizing unauthorized tethering. Communication system 100 comprises tethered devices 102A and 102B, wireless devices 104A-104C, access node 106, communication network 108, and authorization node 110. Examples of a wireless device 104 can include a cell phone, a smart phone, a computing platform such as a laptop, palmtop, or tablet, a personal digital assistant, an internet access device, or other device capable of wireless communication, including combinations thereof. Examples of tethered device 102 can include a cell phone, a smart phone, a computing platform such as a laptop, palmtop, or tablet, a personal digital assistant, including combinations thereof. Wireless device 104A and tethered device 102A communicate over communication link 112A, and wireless device 104C and tethered device 102B communicate over communication link 112B.

Access node 106 is in communication with the wireless devices 104A-104C through communication links 114A-114C and with communication network 108 through communication link 116. Access node 106 is a network node capable of providing wireless communications to wireless devices 104A-104C, and can be, for example, a base transceiver station and an eNodeB device. While three wireless devices are illustrated in communication with access node 106 this is merely illustrative, and in operation any number of wireless devices may be in communication with access node 106.

Communication network 108 is in communication with authorization node 110 over communication link 118 and with access node 106 over communication link 116. Communication network 108 comprises base stations, wireless communication nodes, telephony switches, internet routers, network gateways, computer systems, communication links, or some other type of communication equipment, including combinations thereof.

Communication links 112, 114, 116 and 118 can be wired or wireless communication links. Wired communication links can be, for example, twisted pair cable, coaxial cable, fiber optic cable, or combinations thereof. Wireless communication links can be a radio frequency, microwave, infrared, or other similar signal, and can use a suitable communication protocol, for example, code division multiple access (CDMA) 1xRTT, Universal Mobile Telecommunications System (UMTS), High-Speed Packet Access (HSPA), Evolution Data Optimized (EV-DO), EV-DO rev. A, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 106, communication network 108 and authorization node 110 which are omitted for clarity, including additional processing nodes, routers, gateways, and physical and/or wireless data links for carrying data among the various network elements.

In operation, wireless devices 104A-104C in communication with access node 106 are detected, and from among the plurality of detected wireless devices a suspect list is determined of wireless devices which are not authorized for tethering. An expected hop value is stored for each suspect device. A first data packet is received from each suspect device, and a first hop value is determined for each suspect device. Based on a comparison of the expected hop value and the first hop value, at least one suspect device is identified as performing unauthorized tethering.

Data traveling through a computer network typically passes through more than one network element between the source of the packet and its destination. A "hop" is a portion of path between source and destination between one network element and the next network element in the path. A hop count represents the total number of network elements that data (for example, a data packet) passes through between source and destination. Data packets in a computer network are typically encoded with a limitation on the number of hops permitted to that packet to prevent data packets from circulating in a network indefinitely. In Internet Protocol version 4 (IPv4) the limitation is referred to as a "time to live" or TTL value, while in IP version 6 (IPv6) it is called a "hop limit". This application uses the term "hop value" to refer to the general concept of a hop limitation provided in data, without any limitation to IPv4, IPv6 or any other discrete protocol or technology.

Each time a packet makes a hop, the hop value of the packet is changed to indicate the hop. In an embodiment, the hop value of a packet is set to a predetermined value when the packet is sent from its source, and the hop value is decremented each time it makes a hop, until the hop value reaches zero, at which point the packet is discarded by the next network element which determines that the hop value is zero.

Figure 2:
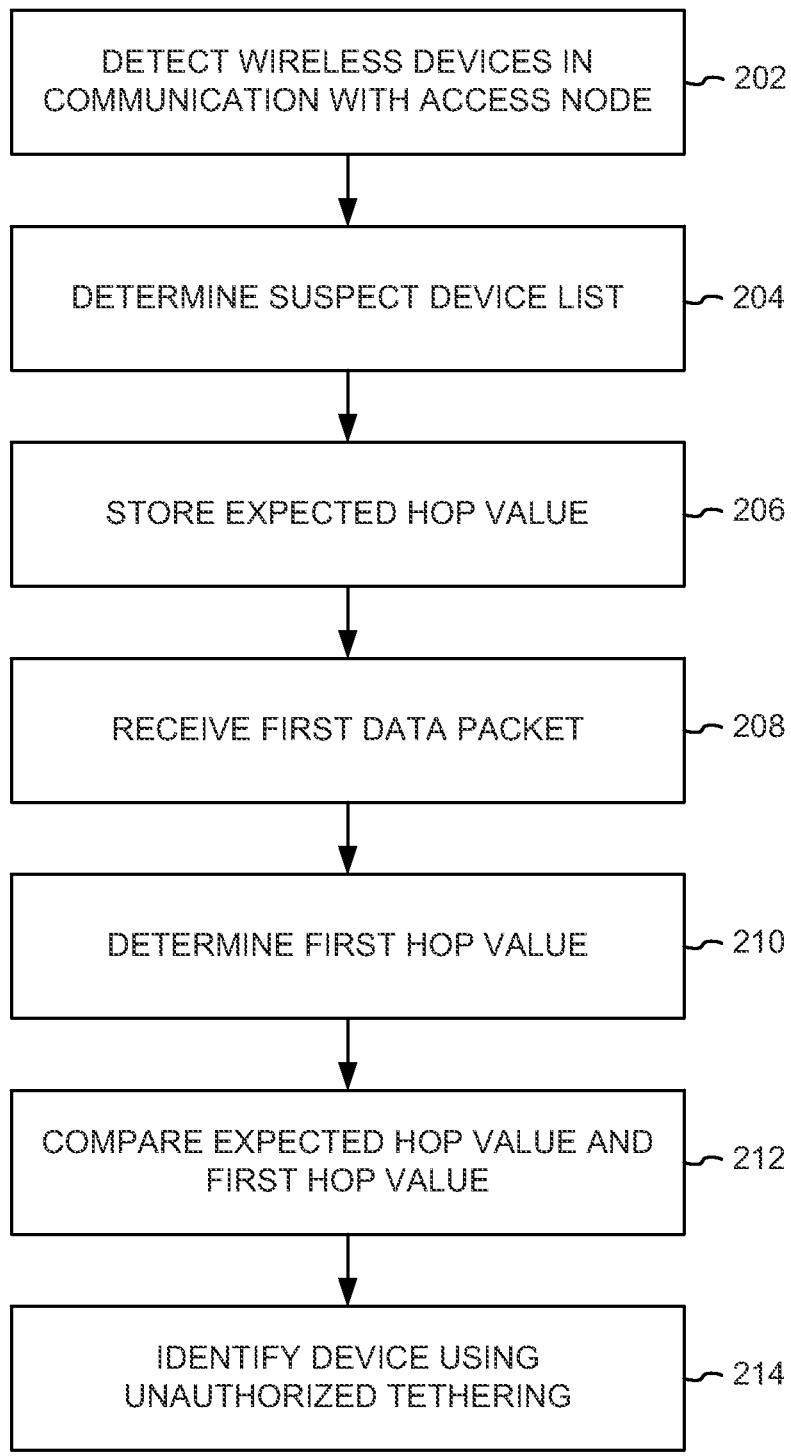
FIG. 2 illustrates an exemplary method of detecting wireless devices utilizing unauthorized tethering.

FIG. 2 illustrates an exemplary method 200 of detecting unauthorized tethering by a wireless device. In operation 202, a plurality of wireless devices 104A-104C in communication with access node 106 are detected. For example, wireless devices 104A-104C can be authorized to access communication network 108 through access node 106, and can have at least one assigned channel of communication with access node 106. In an embodiment, access node 106 provides a list of wireless devices 104A-104C in communication with it, for example, a list of active devices comprising an Active_List or other similar indicator of wireless devices in communication with access node 106. A utilization of network resources by wireless devices 104A-104C can also be provided. For example, utilization by each wireless device 104A-104C of communication links 114A-114C can be provided for each wireless device, as well as an indication of applications running on each wireless devices which are sending, receiving, or requesting data from communication network 108 through access node 106.

In operation 204, a suspect device list of wireless devices which are not authorized for tethering is determined from among the plurality of wireless devices 104A-104C. Based on the determined list of wireless devices 104A-104C in communication with access node 106, a determination can be made of which detected wireless devices are capable of tethering and which are also not authorized to perform tethering. For example, wireless devices 104A-104C can each be so identified, and thus considered suspect devices. In an embodiment, authorization node 110 can be queried based on the detected wireless devices in communication with access node 106, and authorization node 110 can provide capability and authorization information about each of wireless device 104A-104C. Such information can also be provided by another network node such as a home locator register or visitor location register, or by some other similar network node.

An expected hop value for each suspect device is stored (operation 206). In an embodiment, data is encoded at its source with a predetermined hop limit, and the hop limit is changed each time the data makes a hop in the communication system. For example, it is known that data from many wireless devices originate with a hop limit of 64, and that data from many other network devices (such as desktop, laptop, and tablet computing platforms) originate with a hop limit of 128. For each suspect device, an expected hop value is stored. The storage method may include, for example, a table maintained at a network element including an identifier of each suspect device and its expected hop value.

A first data packet is received from each suspect device (operation 208), and a first hop value is determined for each suspect device (operation 210). For example, when data from a wireless device 104A-104C is received a network element associated with access node 106 (for example, a proxy node, a gateway, or another element of access node 106), the data is examined to determine its included hop value. If information indicates that the data is from a wireless device from which data has not been previously received, a record is created for the new wireless device.

In operation 212, the expected hop value and the first hop value are compared. When a wireless device is performing tethering, in addition to originating data to a communication network, the wireless device also acts as a network element through which data from a tethered device passes. Further, the hop value data passing through a wireless device is changed to reflect the hop between the tethered device and the wireless device performing the tethering. Thus, for example, data originating from tethered device 102A will travel one hop from tethered device 102A to wireless device 104A, and the hop value of the data will be changed accordingly to reflect that hop. Accordingly, data originating from a wireless device should have a hop value which matches the expected hop value for the wireless device. However, data originating from tethered device 102A, while appearing to access node 106 (or other network element receiving the data) to come from wireless device 104A, will have a hop value which is inconsistent with the expected hop value for data from wireless device 104A.

Based on the comparison of the expected hop value and the first hop value, a suspect device can be identified as performing unauthorized tethering (operation 214). If not already known, authorization node can be queried to determine whether a tethered device is authorized to perform tethering, and a data record for a wireless device may be updated to reflect whether the wireless device is authorized to perform tethering. For example, it may be determined according to the above that wireless device 104C is performing tethering for tethered device 102B. However, when queried, the authorization node 110 can indicate that wireless device 104C is authorized to perform tethering. For example, wireless device 104C may be associated with a subscription by which wireless device 104C is authorized to perform tethering.

Method 200 can be performed at a proxy node, a gateway, or other network element, which can be associated with access node 106, or which can be associated with communication network 108. In addition, such proxy node, gateway or addition network element can receive data and other information from more than one access node. In such cases, the network element performing method 200 can account for the hop between the access node and the network element performing the method, as well as any hops between the access node and the performing network element. When data and other information is received from multiple access nodes, an access node identifier may also be associated with the data received. In addition, to determine the first hop value of data, not all of the data may be examined, and data may be sampled periodically to reduce processing overhead which may be caused by the examination of data to determine hop values.

Figure 3:
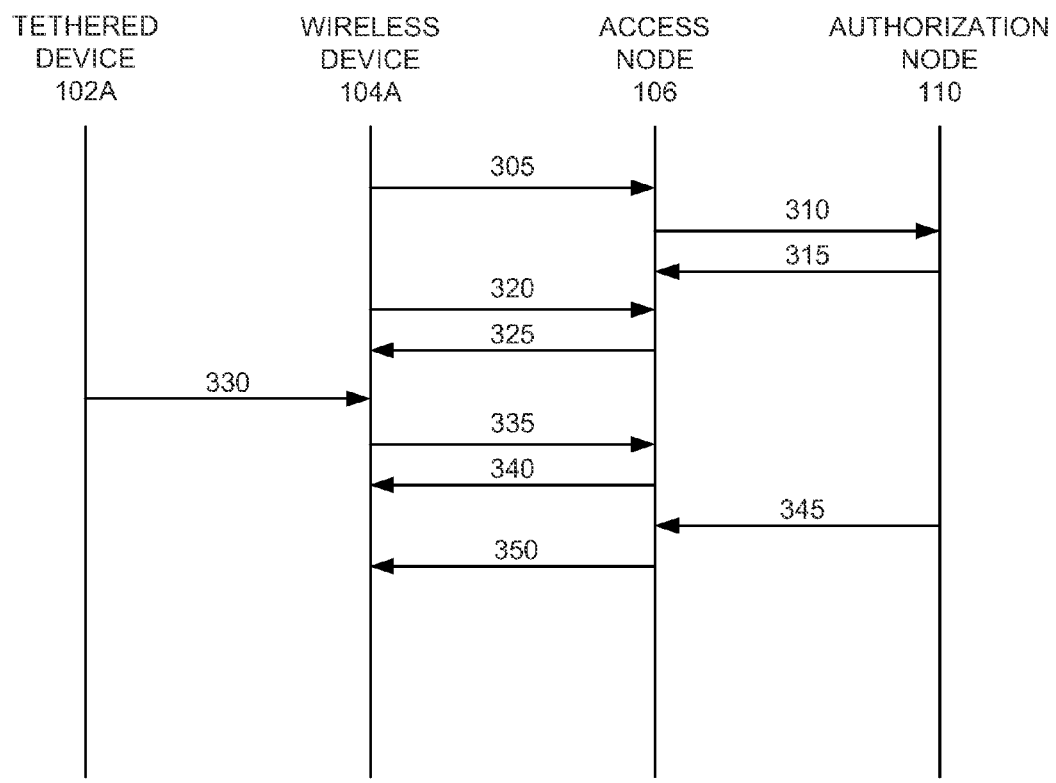
FIG. 3 illustrates a data flow diagram of an exemplary system and method to detect wireless devices utilizing unauthorized tethering.

FIG. 3 illustrated a data flow diagram of an exemplary system and method to detect wireless devices utilizing unauthorized tethering. Wireless device 104A is detected to be in communication with access node 106 (resulting from or related to message 305). Access node 106 can query authorization node 110 (message 310) for information as to whether wireless device 104A is authorized to perform tethering, and authorization node 110 can respond with the information (message 315). An expected hop value for wireless device 104A is stored.

Although FIG. 3 illustrates access node 106, it will be understood that a proxy node, gateway, or other network element associated with access node 106 can also perform the described functions. Further, as described above, a proxy node, gateway, or other network element of a communication system such as communication system 108 can also perform these functions. The illustration of access node 106 in FIG. 3 is intended to cover each and all of these alternatives, as well as equivalents.

A first data packet is received from wireless device 104A (message 320), and a first hop value is determined from the first data packet. Based on a comparison of the first hop value from the first data packet and the expected hop value, a determination can be made as to whether wireless device 104A is performing tethering. In an embodiment, the hop value of message 320 will reflect that message 320 originated from wireless device 104A, and it can be determined that wireless device 104A is not performing tethering. Access node 106 may provide an indication to wireless device 104A (message 325), which can be an indication that continued access to the communication network through access node 106 is permitted at present data rates and/or volumes.

However, when tethered device 102A originates message 330, the result will be different. Wireless device 104A sends a second data packet to access node 106 (message 335), and a second hop value is determined of the second data packet. When the second hop value is compared to the first hop value, it will be determined that the hop values are different. In addition, or alternatively, the second hop value can be compared to the expected hop value. In either case, it will be determined that the second hop value indicates that wireless device 104A is performing tethering. Access node 106 may provide an indication to wireless device 104A (message 340) that continued access to the communication network through access node 106 at present data rates and/or volumes is not permitted, and a data flow to or from wireless device 104A may be adjusted, as further described below.

Authorization node 110 may also provide additional information about wireless device 104A to access node 106. As noted above, a network element detecting unauthorized tethering by a wireless device can account for a hop between the access node and the network element performing the detecting, as well as any hops between the access node and the performing network element. An additional element of complexity arises when a wireless device is being handed off (also referred to as handed over) from one access node to another access node. Handoff is the transfer of a wireless device from a first access node to a second access node, and may be performed due to the mobility of a wireless device, or for network or wireless resource load balancing, or for other purposes. For a period of time after a handoff has been performed, data may be forwarded from the first access node to the second access node, for example, to minimize data loss and provide in-order delivery of data, among other things to reduce data loss during handover which would otherwise trigger a retransmission request for the data. However, the forwarding of data is considered an additional hop, and data arriving at the second access node may include a hop value reflecting the additional hop. Accordingly, data arriving at the second access mode may appear, incorrectly, to have been sent by a wireless device performing tethering.

To address this potential complication, authorization node 110 can provide an indication to access node 106 (message 345) that a wireless device has been handed off from a first access node to a second node, for example, within a predetermined period of time. Accordingly, a weighting factor can be included in the determination of a hop value of data sent from the handed-off wireless device to account for the handoff. In an embodiment, the determined hop value can be incremented to compensate for the additional hop or hops from the first access node to the second access node. Additionally, a message 350 can be provided to wireless device 104A about the weighting factor. In an embodiment, the weighting factor can be used by wireless device 104A as an alternative or, or in addition to, access node 106.

Figure 4:
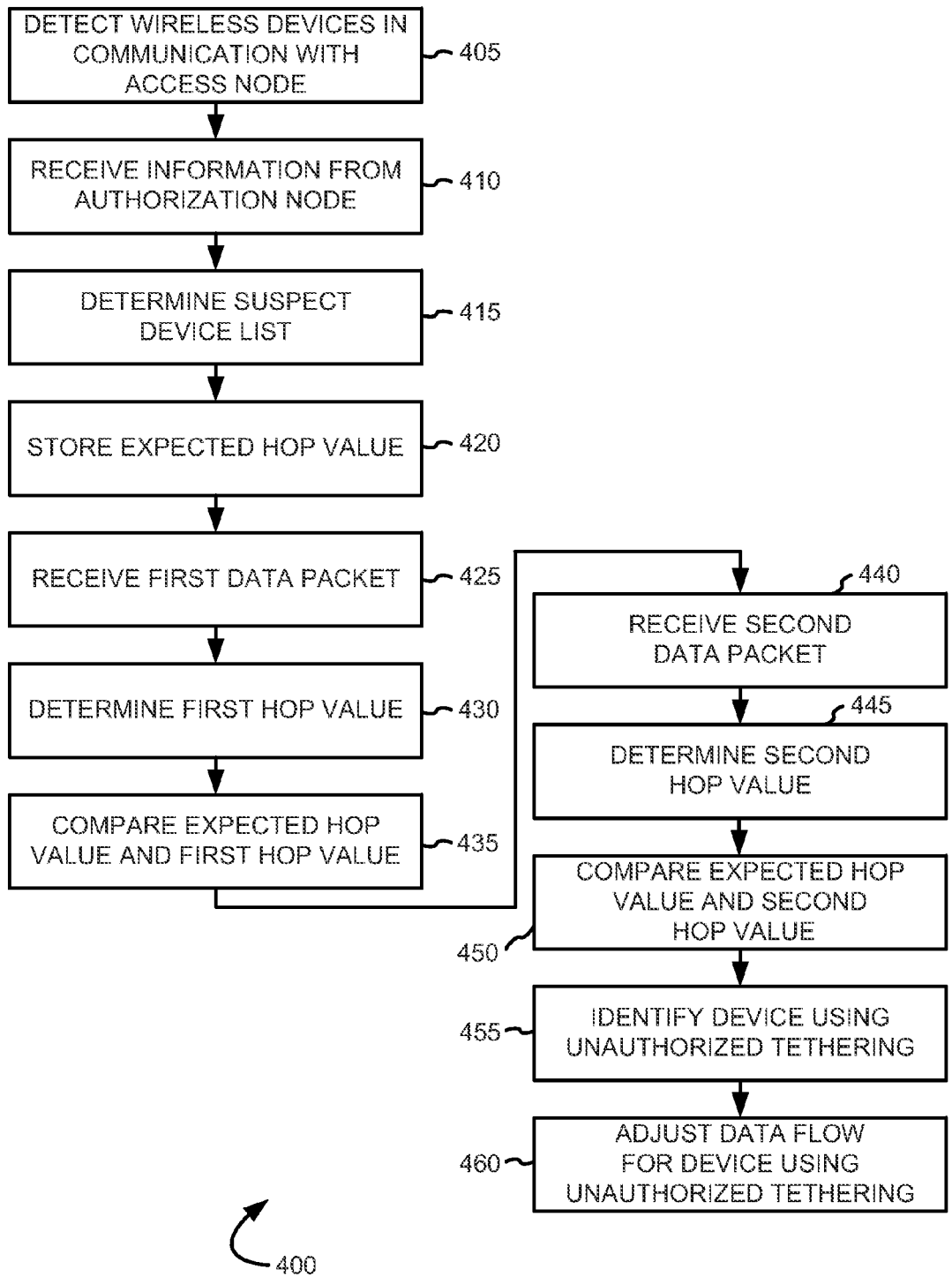
FIG. 4 illustrates another exemplary method of detecting wireless devices utilizing unauthorized tethering.

FIG. 4 illustrates another exemplary method 400 of detecting wireless devices utilizing unauthorized tethering. In operation 405, a plurality of wireless devices 104A-104C in communication with access node 106 are detected. For example, wireless devices 104A-104C can be authorized to access communication network 108 through access node 106, and can have at least one assigned channel of communication with access node 106. In an embodiment, access node 106 provides a list of wireless devices 104A-104C in communication with it, for example, a list of active devices comprising an Active_List or other similar indicator of wireless devices in communication with access node 106, to a proxy node, a gateway, or another network element. A utilization of network resources by wireless devices 104A-104C can also be provided. For example, utilization by each wireless device 104A-104C of communication links 114A-114C can be provided for each wireless device, as can an indication of applications running on each wireless devices which are sending, receiving, or requesting data from communication network 108 through access node 106. In operation 410, information is received from authorization node 110 about whether wireless device 104A-104C are authorized to perform tethering. A suspect device list is determined of wireless devices which are not authorized for tethering (operation 415). In an embodiment, authorization node 110 can be queried based on the detected wireless devices in communication with access node 106, and authorization node 110 can provide capability and authorization information about each of wireless device 104A-104C. Such information can also be provided by another network node such as a home locator register or visitor location register, or by some other similar network node.

In operation 420, an expected hop value for each suspect device is stored. In an embodiment, data is encoded at its source with a predetermined hop limit, and the hop limit is changed each time the data makes a hop in the communication system. For example, is it known that data from many wireless devices originate with a hop limit of 64, and that data from many other network devices (such as desktop, laptop, and tablet computing platforms) originate with a hop limit of 128. For each suspect device, an expected hop value is stored. The storage method may include, for example, a table maintained at a network element including an identifier of each suspect device and its expected hop value.

A first data packet is received from each suspect device (operation 425), and a first hop value is determined for each suspect device (operation 430). For example, when data from a wireless device 104A-104C is received a network element associated with access node 106 (for example, a proxy node, a gateway, or another element of access node 106), the data is examined to determine its included hop value. If information indicates that the data is from a wireless device from which data has not been previously received, a record is created for the new wireless device.

In operation 435, the expected hop value and the first hop value are compared. When a wireless device is performing tethering, in addition to originating data to a communication network, the wireless device also acts as a network element through which data from a tethered device passes. Further, the hop value data passing through a wireless device is changed to reflect the hop between the tethered device and the wireless device performing the tethering. Thus, for example, data originating from tethered device 102A will travel one hop from tethered device 102A to wireless device 104A, and the hop value of the data will be changed accordingly to reflect that hop. Accordingly, data originating from a wireless device should have a hop value which matches the expected hop value for the wireless device. However, data originating from tethered device 102A, while appearing to access node 106 (or other network element receiving the data) to come from wireless device 104A, will have a hop value which is inconsistent with the expected hop value for data from wireless device 104A.

Based on the comparison of the expected hop value and the first hop value, a suspect device can be identified as performing unauthorized tethering (operation 214). If not already known, authorization node can be queried to determine whether a tethered device is authorized to perform tethering, and a data record for a wireless device may be updated to reflect whether the wireless device is authorized to perform tethering. For example, it may be determined according to the above that wireless device 104C is performing tethering for tethered device 102B. However, when queried, the authorization node 110 can indicate that wireless device 104C is authorized to perform tethering. For example, wireless device 104C may be associated with a subscription by which wireless device 104C is authorized to perform tethering.

In operation 440, a second data packet is received from wireless device 104A, and a second hop value is determined of the second data packet (operation 445). The second hop value is compared to the first hop value (operation 450). When it is determined that the first hop value and the second hop value are different, wireless device 104A can be determined to be performing tethering. In addition, or alternatively, the second hop value can be compared to the expected hop value. In either case, it can be determined that the second hop value indicates that wireless device 104A is performing tethering. Further, when wireless device 104A has also been determined to be unauthorized to perform tethering, 104A can be determined to be performing unauthorized tethering (operation 455). Accordingly, a data flow to or from wireless device 104A may be adjusted (operation 460). The data flow can be adjusted in various ways. For example, the data flow to a wireless device can be reduced to a threshold data flow, to preserve network resources for authorized devices. The threshold can be an average network usage. As one example, considering all of the wireless devices in communication with access node 106, if on average a wireless device uses 5% of network resources, then the threshold can be determined to be 5% of available resources, and a usage cap at the threshold can be imposed on unauthorized wireless devices accordingly. Thus, the impact on network utilization of devices performing unauthorized tethering can be mitigated. The data flow to the wireless device can also be terminated. In addition, an amount of data sent to and/or received from a wireless device can be limited to a threshold amount of data per unit time. Also, an amount of time which a wireless device is permitted to access the communication network 108 can be limited to a period of time.

Further, in addition to reducing the data flow to a threshold, a notification can be provided to the wireless device that its unauthorized tethering has been detected, and that the reduction in data flow will be imposed until an indication is received that a subscription for tethering services has been entered into by a user. An opportunity to subscribe to tethering services can also be provided to the wireless device. For example, a web page or portal page can be presented to the wireless device to provide an opportunity to adjust a subscription or to sign up for tethering services. In such case, the data flow to a wireless device can be reduced to a threshold until a subscription confirmation is received, for example, from the wireless device, or from authorization node 110. Similarly, the data flow can be reduced to zero pending receipt of a subscription confirmation.

Figure 5:
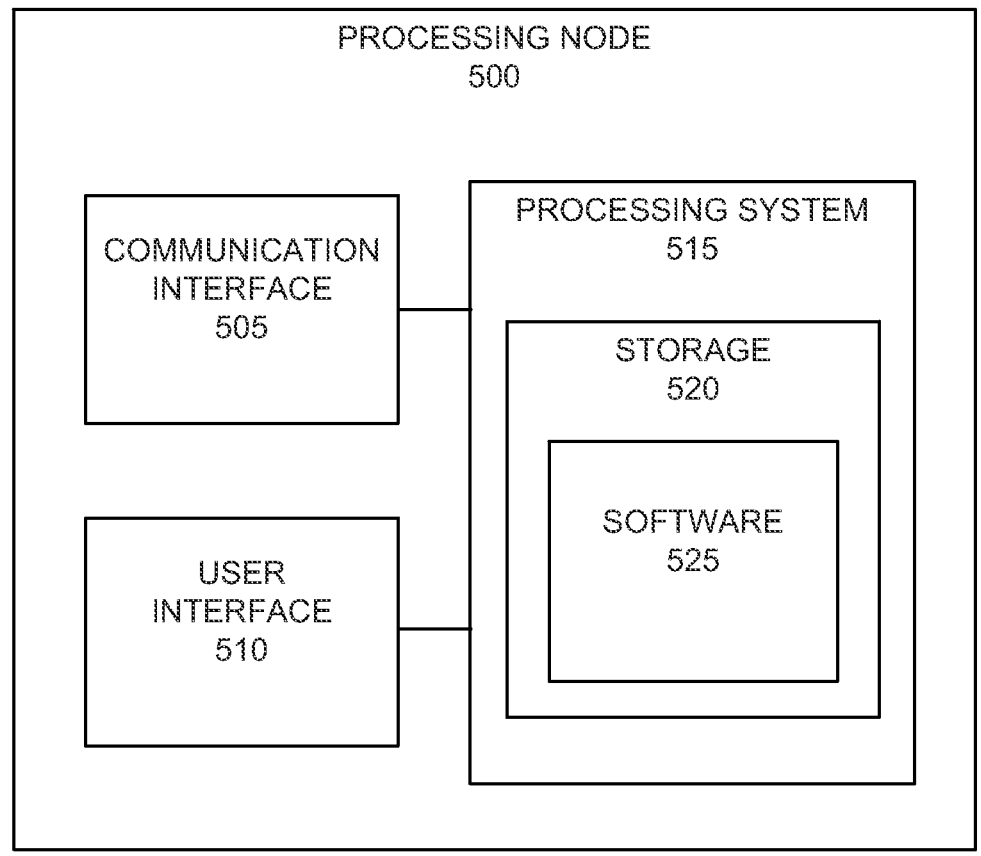
FIG. 5 illustrates an exemplary processing node.

FIG. 5 illustrates an exemplary processing node 500 in a communication system. Processing node 500 comprises communication interface 505, user interface 510, and professing system 515 in communication with communication interface 505 and user interface 510. Processing node 500 is capable of detecting a wireless device utilizing unauthorized tethering. Processing system 515 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 525 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, etc., which are omitted for clarity. Communication interface 505 permits processing node 500 to communicate with other network elements. User interface 510 permits the configuration and control of the operation of processing node 500.

The exemplary systems and methods described herein can be performed under the control of a processing system executing computer-readable codes embedded on a computer-readable recording medium or on communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of detecting unauthorized tethering by a wireless device, comprising:
   detecting a plurality of wireless devices in communication with an access node;
   determining from among the plurality of detected wireless devices suspect devices which are not authorized for tethering;
   storing an expected hop value for each suspect device;
   receiving a first data packet from each suspect device, and determining a first hop value for each suspect device;
   making a first comparison of the expected hop value and the first hop value and identifying at least one suspect device which is performing unauthorized tethering based on the first comparison; and
   adjusting a data flow for each wireless device on the unauthorized device list, wherein adjusting a data flow further comprises at least one of reducing a data flow below a threshold, and reducing a data flow below a threshold until a subscription confirmation is received.

2. The method of claim 1, further comprising:
   receiving a second data packet from each suspect device and determining based on the second data packet a second hop value for each suspect device; and
   making a second comparison of the first hop value to the second hop value and identifying at least one suspect device which is performing unauthorized tethering based on said second comparison.

3. The method of claim 1, wherein determining further comprises determining based on information received from an authorization node that a detected wireless device is unauthorized to tether.

4. The method of claim 3, wherein determining further comprises providing to an authorization node a device identifier of each detected wireless device and determining based on information received from an authorization node that a detected wireless device is unauthorized to tether.

5. The method of claim 1, further comprising:
   determining that the wireless device has been handed off within a predetermined period of time, and adding a weighting factor to the second comparison when the wireless device has been handed off.

6. The method of claim 1, wherein the threshold is an average network usage.

7. The method of claim 1, wherein the expected hop value, the first hop value and the second hop value are each a time-to-live value.

8. The system of claim 1, wherein the network node is further configured to determine from among the plurality of detected wireless devices a list of suspect devices which are not authorized for tethering based on information received from an authorization node that a detected wireless device is unauthorized to tether.

9. The system of claim 8, wherein the network node is further configured to determine from among the plurality of detected wireless devices a list of suspect devices which are not authorized for tethering by providing to an authorization node a device identifier of each detected wireless device and determining based on information received from an authorization node that a detected wireless device is unauthorized to tether.

10. A system for detecting unauthorized tethering by a wireless device, comprising:
    a network node configured to
       detect a plurality of wireless devices in communication with an access node;
       determine from among the plurality of detected wireless devices a list of suspect devices which are not authorized for tethering;
       store an expected hop value for each suspect device;
       receive a first data packet from each suspect device, and determining a first hop value for each suspect device;
       make a first comparison of the expected hop value and the first hop value and identifying at least one suspect device which is performing unauthorized tethering based on the first comparison; and
       adjust a data flow for each wireless device on the unauthorized device list, wherein to adjust the data flow further comprises at least one of to reduce a data flow below a threshold, and to reduce a data flow below a threshold until a subscription confirmation is received.

11. The system of claim 10, wherein the network node is further configured to:
    receive a second data packet from each suspect device and determining based on the second data packet a second hop value for each suspect device; and
    make a second comparison of the first hop value to the second hop value and identifying at least one suspect device which is performing unauthorized tethering based on said second comparison.

12. The system of claim 10, wherein the network node is further configured to determine that the wireless device has been handed off within a predetermined period of time, and add a weighting factor to the second comparison when the wireless device has been handed off.

13. The system of claim 10, wherein the threshold is an average network usage.

14. The system of claim 10, wherein the expected hop value, the first hop value and the second hop value are each a time-to-live value.

15. The system of claim 10, wherein the network node is associated with an access node.

* * * * *